(12) United States Patent
Zhang et al.

(10) Patent No.: US 9,927,313 B2
(45) Date of Patent: Mar. 27, 2018

(54) PRESSURE SENSING DEVICE

(71) Applicants: Jinyu Zhang, Shenzhen (CN); Rui Zhang, Shenzhen (CN)

(72) Inventors: Jinyu Zhang, Shenzhen (CN); Rui Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 107 days.

(21) Appl. No.: 15/011,456

(22) Filed: Jan. 29, 2016

(65) Prior Publication Data
US 2017/0010166 A1 Jan. 12, 2017

(30) Foreign Application Priority Data
Jul. 9, 2015 (CN) .......................... 2015 1 0400008

(51) Int. Cl.
*G01L 9/00* (2006.01)
*G01L 19/00* (2006.01)

(52) U.S. Cl.
CPC ........ *G01L 19/0084* (2013.01); *G01L 9/0044* (2013.01)

(58) Field of Classification Search
CPC ......... G01L 9/008; G01L 7/00; G01L 13/025; G01L 19/0084; G01L 9/0044
USPC .......................... 73/723, 715, 717, 753, 700
See application file for complete search history.

(56) References Cited

U.S. PATENT DOCUMENTS 8,634,924 B1 * 1/2014 Ko ....................... H04R 25/606
607/115
2015/0068314 A1 * 3/2015 Nakamura ............ G01L 9/0072
73/724

FOREIGN PATENT DOCUMENTS

CN 202310061 * 7/2012 ............... H04R 3/00
CN 103257007 A * 8/2013 ............... G01L 1/18

* cited by examiner

*Primary Examiner* — Manish S Shah
*Assistant Examiner* — Nigel Plumb
(74) *Attorney, Agent, or Firm* — Na Xu; IPro, PLLC

(57) ABSTRACT

A pressure sensing device is disclosed in the present disclosure. The pressure sensing device includes a bottom plate, a flexible shell and a MEMS pressure sensor. The flexible shell covers the bottom plate for forming a hermetical cavity, and the MEMS pressure sensor is accommodated in the hermetical cavity. Air in the hermetical cavity is compressed when the flexible shell is pressed, the MEMS pressure sensor is configured for detecting variation of an air pressure within the hermetical cavity when the flexible shell is pressed, and convert the variation of the air pressure into an electric signal.

12 Claims, 2 Drawing Sheets

PRESSURE SENSING DEVICE

FIELD OF THE DISCLOSURE

The present disclosure generally relates to sensor technologies, and more particularly, to a pressure sensing device.

BACKGROUND

Portable electronic devices, such as smart phones, tablet computers, wearable smart devices, or the like, become more and more popular with development of mobile internet technology and wireless communication technology. Some of the portable electronic devices may include various kinds of sensing devices to improve functionality and user experience. For example, a typical portable electronic device may include a pressure sensor for performing pressure sensing and altitude sensing. Normally, the pressure sensor used in the portable electronic device is a strain transducer; however, a measurement precision of the strain transducer is low.

Therefore, it is desired to provide a new pressure sensing device which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
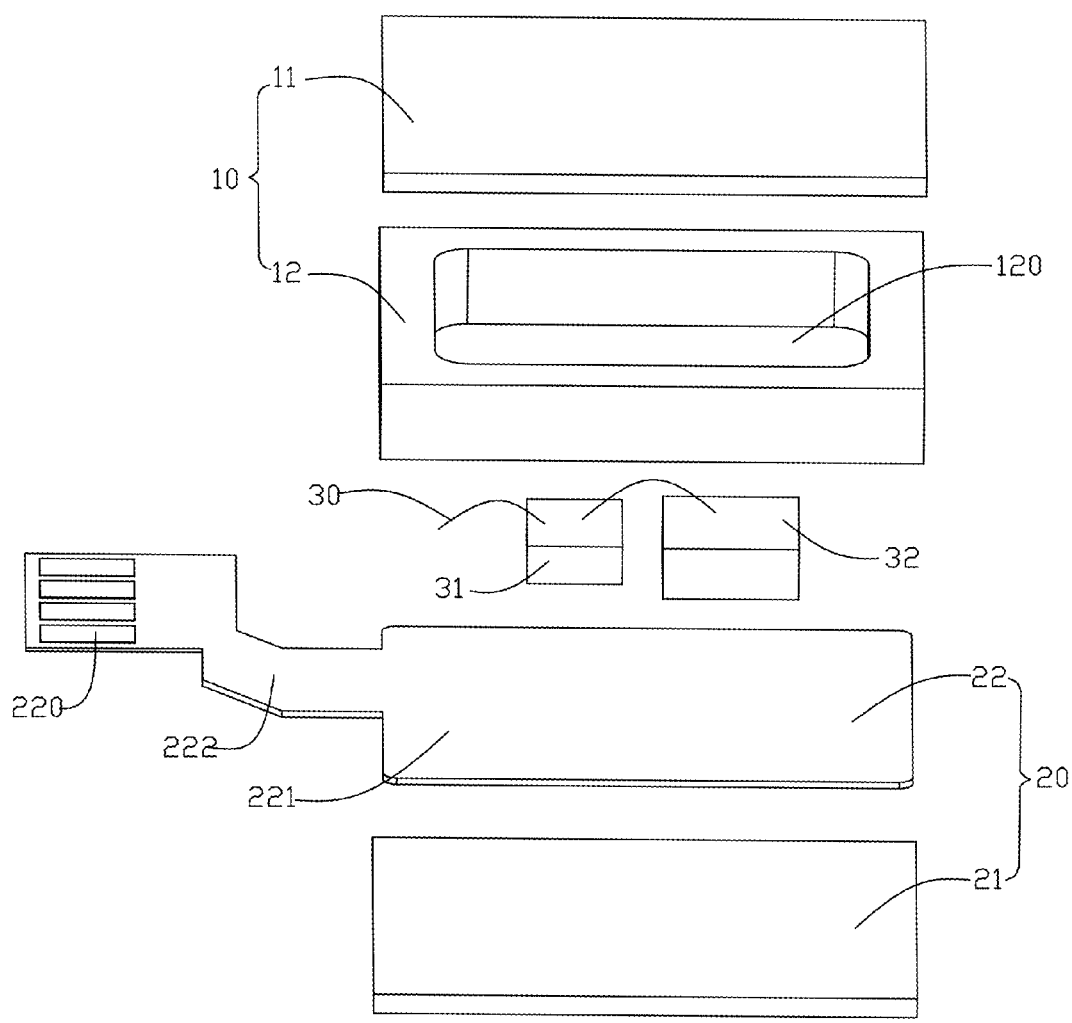
FIG. 1 is a schematic exploded view of a pressure sensing device according to an embodiment of the present disclosure.
Figure 2:
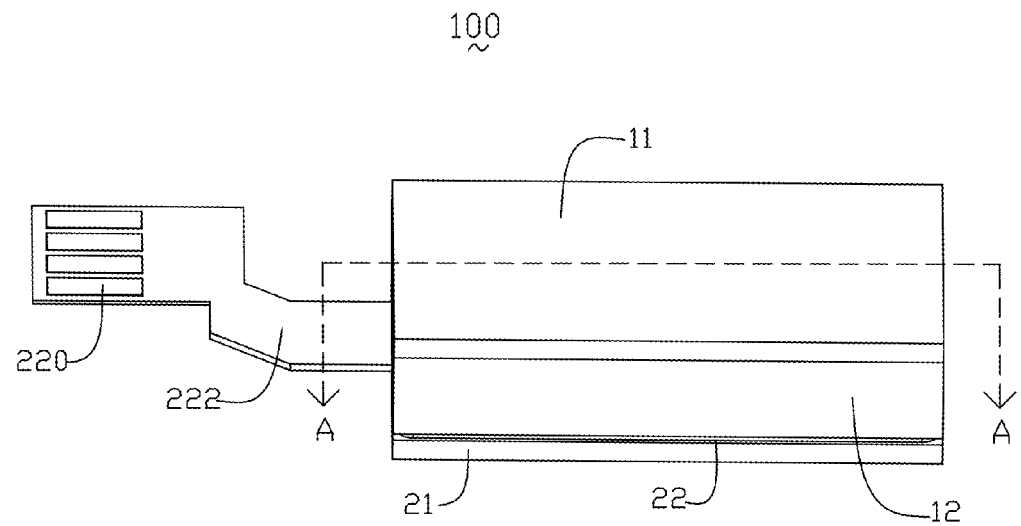
FIG. 2 is an assembled view of the pressure sensing device of FIG. 1.
Figure 3:
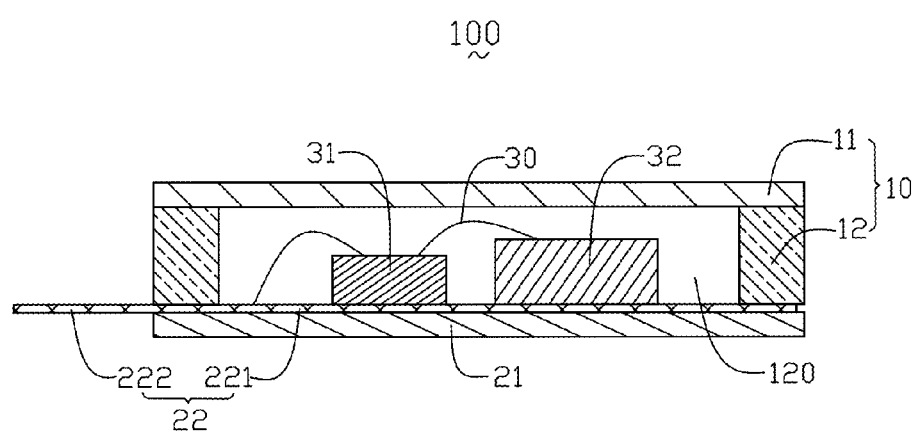
FIG. 3 is a cross-sectional view of the pressure sensing device of FIG. 2, taken form line A-A.

Referring to FIGS. 1-3, a pressure sensing device 100 according to an embodiment of the present disclosure is shown. The pressure sensing device 100 may be applied in a portable electronic device such as a smart phone, a tablet computer, a wearable smart device, or the like. The pressure sensing device 100 includes a bottom plate 20, a flexible shell 30, a MEMS (micro electro-mechanical systems) pressure sensor 32 and an ASIC (application specific integrated circuit) chip 31. The flexible shell 10 covers the bottom plate 20 to form a hermetical cavity 120. The MEMS pressure sensor 32 and the ASIC chip 31 are accommodated in the hermetical cavity 120.

Specifically, the flexible shell 10 may include a flexible frame 12 and a rigid cover 11 covering the flexible frame 12. The flexible frame 12 locates between the bottom plate 20 and the rigid cover 11. The flexible frame 12 may perform elastic deformation when the rigid cover 11 is pressed, and in this circumstance, the hermetical cavity 120 is compressed such that air in the hermetical cavity 120 suffers compression.

The bottom plate 20 may include a rigid substrate 21 and a flexible printed circuit board 22 placed on the rigid substrate 21. The flexible printed circuit board 22 includes a main body 221 disposed in the hermetical cavity 120, and an extending portion 222 extending from the main body 221 and out of the hermetical cavity 120. Moreover, a plurality of solder pads 220 are formed at an end of the extending portion 222, the solder pads 220 may be connected to an external circuit, and are configured for outputting the electric signal processed by the ASIC chip 31 to the external circuit.

The MEMS pressure sensor 32 and the ASIC chip 31 are mounted on the main body 222 of the flexible printed circuit board 22. The MEMS pressure sensor 32 is electrically connected with the ASIC chip 31 via a connecting wire 30, and the ASIC chip 31 is further connected with the flexible printed circuit board 22 via another connecting wire 30. The connecting wire 30 may for example be a gold wire.

In the embodiment as illustrated in FIG. 1, the MEMS pressure sensor 32 and the ASIC chip 31 are two separate and independent chips, and it should be noted that the MEMS pressure sensor 32 and the ASIC chip 31 may alternatively be integrated into a one-piece component.

In an alternative embodiment, the MEMS pressure sensor 32 and the ASIC chip 31 may be disposed on the flexible shell 10; in another alternative embodiment, the MEMS pressure sensor 32 and the ASIC chip 31 may be respectively disposed on the flexible printed circuit board 22 and the flexible shell 10. Furthermore, the bottom plate 20 may alternatively be a printed circuit board with solder pads, the MEMS pressure sensor 32 and the ASIC chip 31 are mounted on the printed circuit board, and the ASIC chip 31 may be electrically connected with the solder pads via connecting lines of the printed circuit board.

In operation, when the rigid cover 11 of the flexible shell 10 is pressed, the flexible frame 12 performs elastic deformation and therefore air in the hermetical cavity 120 is compressed; this causes an air pressure within the hermetical cavity 120 to be varied. The MEMS pressure sensor 32 detects variation of the air pressure within the hermetical cavity 120, and converts the variation of the air pressure into an electric signal, and then output the electric signal to the ASIC chip 31 via the connecting wire 30. Upon reception of electric signal, the ASIC chip 31 performs necessary signal processing on the electric signal, and then outputs the electric signal to the flexible printed circuit board 22. The flexible printed circuit board 22 further outputs the electric signal to the external circuit via the solder pads 220 on the extending portion 22 thereof.

Alternatively, the flexible shell 10 may include a flexible cover and a rigid frame; the rigid frame locates between the flexible cover and the flexible cover and the bottom plate 20. With this configuration, the flexible cover may perform elastic deformation when being pressed, such that the air in the hermetical cavity 120 is compressed and the air pressure is correspondingly varied.

The pressure sensing device 100 as provided in the present disclosure measures a pressure applied onto the flexible shell 10 by detecting variation of the air pressure within the hermetical cavity 12; this can improve the pressure measurement precision effectively with a simple configuration, and furthermore, the flexible shell 10 may also enhance user experience of the pressure sensing device 100.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pressure sensing device, comprising:
   a bottom plate;
   a flexible shell covering the bottom plate and forming a hermetical cavity cooperatively with the bottom plate; and
   a MEMS pressure sensor accommodated in the hermetical cavity;
   wherein the flexible shell comprises a rigid cover and a flexible frame, the flexible frame locates between the rigid cover and the bottom plate for performing elastic deformation, air in the hermetical cavity is compressed when the flexible shell is pressed, the MEMS pressure sensor is configured for detecting variation of an air pressure within the hermetical cavity when the flexible shell is pressed, and converting the variation of the air pressure into an electric signal.

2. The pressure sensing device of claim 1, further comprising an ASIC chip electrically connected to the MEMS pressure sensor and accommodated in the hermetical cavity, wherein the ASIC chip is configured for receiving the electric signal from the MEMS pressure sensor and performing signal processing on the electric signal.

3. The pressure sensing device of claim 2, wherein the bottom plate comprises a rigid substrate and a flexible printed circuit board placed on the rigid substrate, the ASIC chip is electrically connected with the flexible printed circuit board.

4. The pressure sensing device of claim 3, wherein the flexible printed circuit board comprises a main body disposed in the hermetical cavity, and an extending portion extending from the main body and out of the hermetical cavity.

5. The pressure sensing device of claim 4, further comprising a plurality of solder pads formed at an end of the extending portion, wherein the solder pads are configured for outputting the electric signal processed by the ASIC chip to the external circuit.

6. The pressure sensing device of claim 4, wherein the MEMS pressure sensor and the ASIC chip are both disposed on the main body of the flexible printed circuit board.

7. The pressure sensing device of claim 3, wherein the MEMS pressure sensor and the ASIC chip are respectively disposed on the flexible printed circuit board and the flexible shell.

8. The pressure sensing device of claim 2, wherein the MEMS pressure sensor and the ASIC chip are both disposed on the flexible shell.

9. The pressure sensing device of claim 2, wherein the bottom plate is a printed circuit board, the MEMS pressure sensor and the ASIC chip are mounted on the printed circuit board.

10. The pressure sensing device of claim 9, wherein the printed circuit board comprises a plurality of solder pads; and the ASIC chip is electrically connected with the solder pads via connecting lines of the printed circuit board.

11. The pressure sensing device of claim 2, wherein the MEMS pressure sensor and the ASIC chip are two separate and independent chips.

12. The pressure sensing device of claim 2, wherein the MEMS pressure sensor and the ASIC chip are integrated into a one-piece component.

\* \* \* \* \*